W. Cook,
Rolling Pin,
Nº 83,934. Patented Nov. 10. 1868

Witnesses,
Wm A Morgan
G C Cotton

Inventor;
W. Cook
Per Munn & Co.
Atty's

WARREN COOK, OF ARSENAL, PENNSYLVANIA.

Letters Patent No. 83,934, dated November 10, 1868.

IMPROVED ROLLING-PIN.

The Schedule referred to in these Letters Patent and making part of the same.

*To all whom it may concern:*

Be it known that I, WARREN COOK, of Arsenal, in the county of Allegheny, and State of Pennsylvania, have invented a new and useful Improvement in Kitchen-Utensils; and I do hereby declare that the following is a full, clear, and exact description thereof, which will enable others skilled in the art to make and use the same, reference being had to the accompanying drawings, forming part of this specification, in which—

Similar letters of reference indicate like parts.

Figures 1, 2:
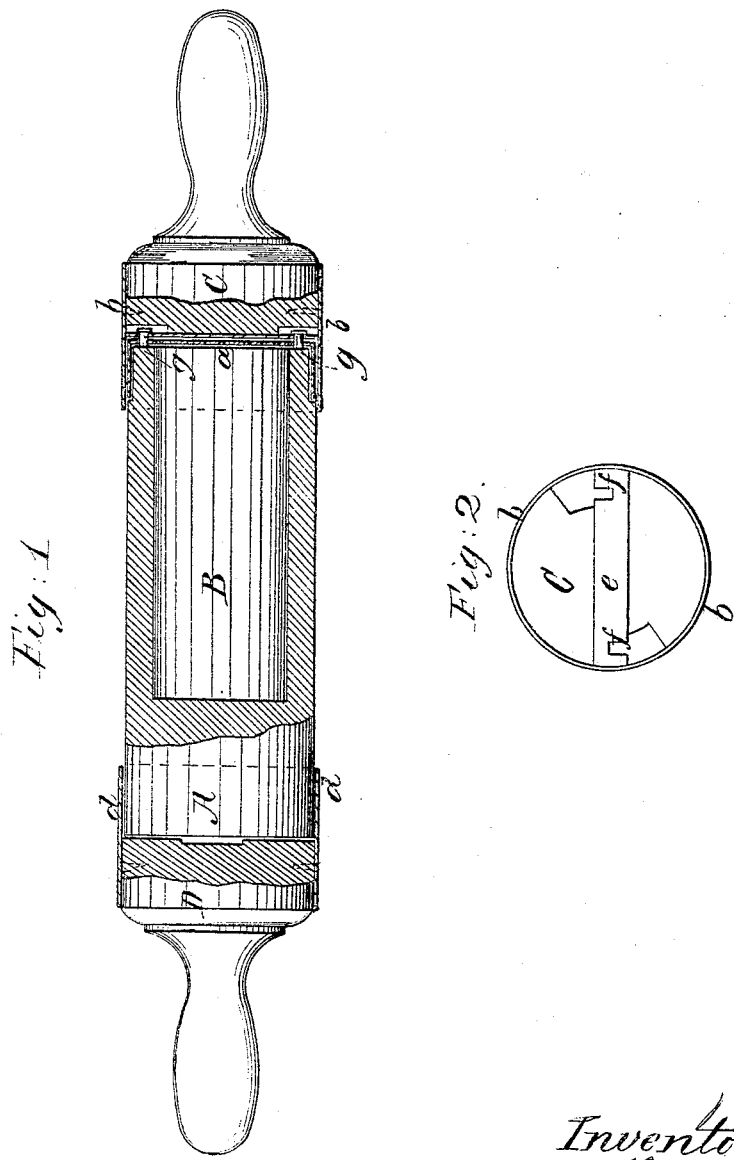
Figure 1 is a sectional side view of my invention.
Figure 2 is a front view of one of the handles.

The object of this invention is to provide a rolling-pin, which is available for several culinary uses, as will be found set forth in the following.

A is the cylindrical part of the roller, having a cavity, B, the opening of which is covered with a perforated cap, $a$, which enables the part A to be used as a dredging-box, when the handle C is removed.

This handle is provided with a metal band, $b$, which fits on the end of the roller A.

The handle D is also provided with a similar band, $d$, by means of which the said handle is made readily removable from the roller A.

The handle C is provided with an interior plate, $e$, having notches, $f$, to catch upon the headed studs projecting from the end of the roller.

By means of this device, the handle C is fastened more securely to the roller.

The studs $g$ project through holes in the cap, $a$, which holes are sufficiently large to permit the said cap to be removed when the roller is to be charged with flour.

When both handles are on, the roller is then available as a rolling-pin; when the handle D is removed, it is available as a potato-masher; when the handle C is removed, it is available as a dredging-box.

Having thus described my invention,

I claim as new, and desire to secure by Letters Patent—

The kitchen-utensil, consisting of the cylinder A, having a cavity, B, the removable perforated cap $a$, and the detachable handles C D, provided respectively with bands $b$ $d$, substantially/as herein set forth and shown, for the purposes specified.

The above specification of my invention signed by me, this 6th day of June, 1868.

WARREN COOK.

Witnesses:
W. M. CLIFTON,
DAVID DOUGHTY.